United States Patent Office 3,666,446
Patented May 30, 1972

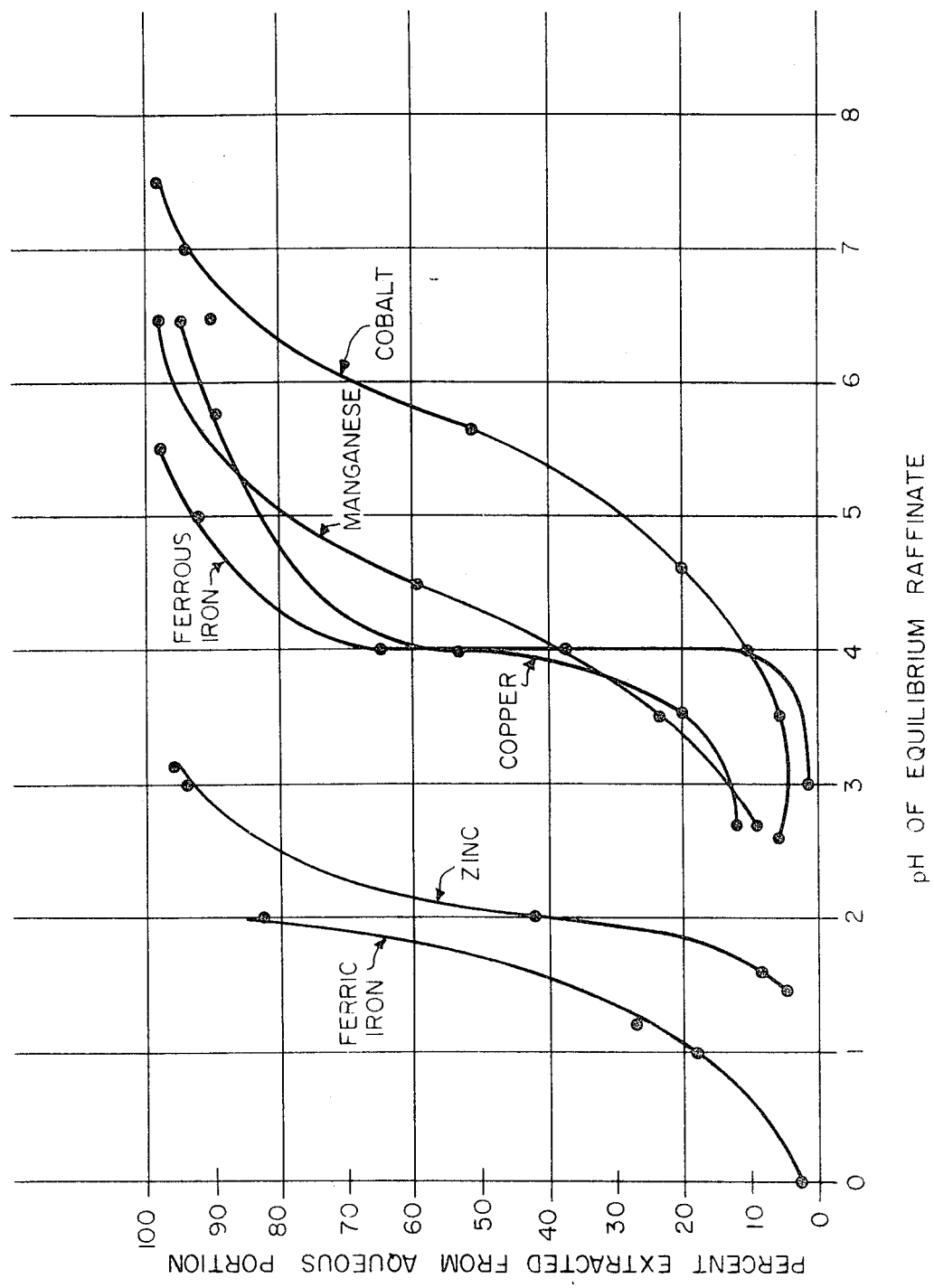

---

3,666,446
PROCESS FOR SOLVENT EXTRACTION OF METALS
Lorne F. Cook, Hockessin, and Wallace W. Szmokaluk, New Castle, Del., assignors to The Pyrites Company, Inc., Wilmington, Del.
Filed Nov. 12, 1969, Ser. No. 875,676
Int. Cl. C22b 23/04, 15/00
U.S. Cl. 75—101 BE
13 Claims

---

ABSTRACT OF THE DISCLOSURE

Solvent ion exchange reaction in which the pH of the metal-bearing liquor is regulated by an ion exchange reaction where hydrogen ions in the aqueous liquor are exchanged for metal cations in an ion extractant. Process enables loading an ion extractant with metals in the metal-bearing liquor without interstage pH adjustment. The loaded ion extractant is treated with a ligand to strip the extractant and render it capable of reuse.

---

BACKGROUND OF THE INVENTION

This invention is concerned with separating various metals from an aqueous solution containing metals in the form of dissolved salts. The preparation of the aqueous solution of such salts is not part of the invention and is explained only in enough detail to facilitate understanding of the disclosed invention.

There are various sources of metals available which when roasted and dissolved in water furnish a metal bearing liquor. In order to make commercial use of these metals, they must be removed from the metal-bearing liquor. In some instances, two or more different metals present in the liquor must be separated from each other. The classical wet method for removal and separation includes a series of precipitation and filtering steps. In each of a series of steps, a particular pH is reached by the addition of a base, for example, limestone. At a particular pH, metal precipitates form. The resulting metal precipitates are then filtered and removed. The process is continued by precipitating each of the various metals in the metal-bearing liquor.

Drawbacks associated with the foregoing process include high capital cost equipment and incomplete separation of the precipitate from the metal-bearing liquor. In regard to the latter drawback, even a compound that is considered to be insoluble exhibits some solubility in an aqueous medium. The significance of this solubility is especially critical if the most desired metal is the last metal in the series. With the precipitation and filtration processes, the last metal to be removed from a metal-bearing liquor can contain as impurities trace amounts of other metals which were originally present in the metal-bearing liquor and which were not completely removed.

As an alternative to the foregoing classical wet method, solvent extraction methods have also been employed. However, with the known prior art processes for extracting base metals, and indeed with the disclosed process for extracting these metals, a pH control is required. It is well known that certain metals, for example base metals, can only be extracted from an aqueous solution when that aqueous solution is at the characteristically narrow pH range required for extraction of that metal. [As used throughout the specification and claims, the term "base metal" is intended to include metals with atomic numbers from 22–30, 42, 48, 50, 51, 73, 74, 82 and 83. Particularly associated with the term base metals are iron, zinc, lead, copper, nickel, cobalt and cadmium.] Thus, for solvent extraction of certain metals, it is necessary to bring the aqueous solution to a proper pH which is the particular pH for extraction of the metal desired. Control of pH is accomplished by adding a base such as sodium hydroxide, sodium carbonate, ammonium hydroxide or limestone to the metal-bearing liquor. This procedure is commonly referred to as "interstage pH control." It is quite apparent that drawbacks which are normally associated with the classical wet method are also present in the known prior art solvent extraction methods, particularly high cost of equipment.

SUMMARY OF THE INVENTION

In accordance with the present invention, the pH of the metal-bearing liquor is controlled, adjusted and regulated at a desired value or values by extracting hydrogen ions from the metal-bearing liquor with an ion extractant (ion exchanger). With the pH at the proper value for a particular metal, additional amounts of the same or a different ion extractant are utilized to extract ions from the metal-bearing liquor.

In a side invention of the process, the loaded ion extractant is treated with a ligand to chelate the ion or ions, thus stripping the ions from the ion extractant and rendering it capable of reuse.

OBJECTS AND ADVANTAGES OF THE INVENTION

It is accordingly an object of the present invention to provide an improved process for separating metals from said metal-bearing liquors.

It is a further object of the invention to adjust and control the pH of a metal-bearing liquor by extracting hydrogen ions with an ion extractant.

It is an additional object of the present invention to provide a method of treating loaded ion extractants to render them capable of reuse.

BRIEF DESCRIPTION OF THE DRAWING

The sole figure of the drawing is a graph showing the pH range at which various metals can be extracted from an aqueous solution.

DESCRIPTION OF THE PREFERRED EMBODIMENTS

Although metal extraction from metal-bearing liquors can be accomplished most efficiently in accordance with the present invention with many aqueous metal systems, the process of the present invention is described in reference to a sulphate solution containing among other metals cobalt and copper. The broad concept of the invention is to extract hydrogen ions from the metal-bearing liquor to adjust the pH to the value required for ion extraction of a particular metal or group of metals. Once the foregoing step is performed, the desired ion or group of ions can be extracted. In this regard, a complete process is described only to illustrate the invention, but it is to be understood that the invention is not intended to be limited by any particular ion extractant disclosed. In the same regard, a sulphate solution of base metals is disclosed. It is to be understood, however, that other metals in other solutions are usable in accordance with the invention, that is, by way of example and not by way of limitation, nitrate and chloride solutions formed from nitric and hydrochloric acids, respectively. A sulphate solution is particularly used to illustrate the process of the present invention since all of the metals disclosed in the specification are soluble as sulphates. However, should a particular undisclosed metal be insoluble as a sulphate but soluble as a nitrate or chloride, or indeed as any other salt, then it is within the scope of the invention to place such a metal in solution through the vehicle of an appropriate acid.

At the outset, the invention is described in its broadest aspects. Broadly defined, the invention includes supplying an aqueous feed containing ions to be extracted. A suitable extractant is prepared. The aqueous feed is then contacted with the extractants to remove hydrogen ions and bring the aqueous feed or metal-bearing liquor to the required pH for removal of a particular metal ion or ions. The metal-bearing liquor is then contacted with an extractant, which may be the same or a different extractant from the extractant used to remove the hydrogen ions, to remove a desired metal or metals. Since the ion extractant preferentially first extracts hydrogen ions and thereafter extracts metals once a characteristic pH is reached, the extractant sequentially extracts hydrogen ions followed by metal ions and so forth. The ion extractant is then contacted with ligands to form a chelate which strips the extractant and renders it capable of reuse. The regenerated extractant is then allowed to contact fresh aqueous feed to repeat or continue the process.

A typical source of base metals is an ore such as iron pyrites which includes as sulfides iron, cobalt, nickel, zinc, manganese, magnesium, calcium and copper. Such a source is roasted to drive off sulfur dioxide, converting the sulphides to sulphates. After roasting, the metals are leached out of the source with water. Due to the presence of acid anhydrides, the resulting metal-bearing liquor is at a low acid pH.

As was pointed out above, the invention involves the use of an extractant to adjust and control the pH of the metal-bearing liquor. In this regard, many extractants are usable in accordance with the invention, such as various metal or ammonium forms of carboxylic acids, organo phosphorous compounds, oximes, amines and mixtures of the foregoing, as well as solid ion exchange resins of the phenolic, polystyrene, acrylic, epoxy-polyamines, sulfonic and iodoamino types, including mixtures of these solid resins.

The carboxylic acid compounds which are usable in ammonium or metal forms include, by way of example and not by way of limitation, naphthenic acid, pelargonic acid, 2,2-dimethyl propionic acid, capric acid, butyric acid and 3,5-dinitro benzoic acid.

The organo phosphorous compounds which are utilized in metal or ammonium form include acid compounds of the following formula:

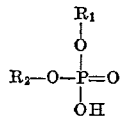

where $R_1$ and $R_2$ are selected from the group consisting of alkyl, aryl, and aralkyl radicals. Since the compound must be substantially water-immiscible, the total number of carbon atoms in the molecule should be sufficient to render the compound substantially insoluble. Generally at least 4–20 carbon atoms should be present on each R group. $R_1$ and $R_2$ can be the same radical. The $R_1$ and $R_2$ groups can, of course, be substituted with a variety of groups such as alkoxy, halogen, etc., and $R_1$ and $R_2$ can be saturated or unsaturated or interrupted by hetero atoms so long as there is no interference in the performance of the compound in extracting ions from the aqueous phase to the organic phase.

Particular organophosphoric acid compounds which can be advantageously used according to this invention include di(2-ethylhexyl) phosphoric acid, heptadecylphosphoric acid, dodecylphosphoric acid, di(1-methyl-heptyl) phosphoric acid, diiooctylphosphoric acid, di(2-ethyl-4-methyl-pentyl) phosphoric acid, di(2-propyl-4-methyl-pentyl) phosphoric acid, octylphenyl phosphoric acid, the isooctyl or stearyl derivatives of alkyl acid phosphates and the like.

The oxime compounds which are usable in ammonium or metal forms include dimethyl glyoxime, cyclohexanedionedioxime and furildioximes.

The oxime compounds also include metal or ammonium forms of α-hydroxy oxime of the general formula:

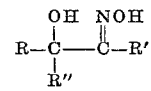

where R, R' and R'' may be any of a variety of organic hydrocarbon radicals such as aliphatic and alkylaryl radicals. R'' may also be hydrogen. Preferably, R and R' are unsaturated hydrocarbon or branched chain alkyl groups containing from about 6 to 20 carbon atoms. R and R' are also preferably the same and, when alkyl, are preferably attached to the carbons substituted with the —OH and =NOH groups through a secondary carbon atom. It is also preferred that R'' is hydrogen or unsaturated hydrocarbon or branched chain alkyl groups containing from about 6 to 20 carbon atoms. The α-hydroxy oximes also preferably contain a total of about 14 to 40 carbon atoms. Representative compounds are 19-hydroxyhexatriaconta-9,27-dien-18-oxime, 5,10-diethyl-8-hydroxy-tetradecan-7-oxime, and 5,8-diethyl-7-hydroxy-dodecane-6-oxime. The latter compound has the following structural formula:

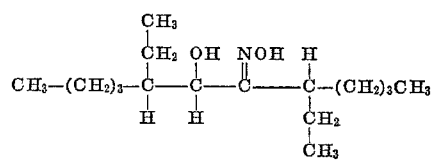

Representative of other mono- and polyunsaturated radicals are heptenyl, octenyl, decenyl, octadecenyl, octadecynyl and alkyl substituted radicals such as ethyloctadecenyl. Representative of other mono- and polyalkyl substituted saturated radicals are ethylhexyl, diethylheptyl, butyldecyl, butylhexadecyl, ethyldodecyl, butylcyclohexyl and the like.

The α-hydroxy oxime component is also characterized as having a solubility of at least 2% by weight in the hydrocarbon solvent used to make up the organic phase and substantially complete insolubility in water.

In accordance with the present invention, amine compounds have utility in raising the pH of the metal-bearing liquor and can be utilized for this purpose in combination with the disclosed cationic extractants. When so utilized, the amines are in their free base form. Since the basicity of free amines is often such as to cause precipitation of metals in the aqueous phase, amines are not generally suitable when used alone for a complete extraction process as is the case with the disclosed cationic extractants. However, an important aspect of amines is that they not only neutralize the pH of the metal-bearing liquor but also extract iron values from the liquor.

In accordance with the invention, the following amines have utility with the disclosed extractants for adjusting the pH of the metal-bearing liquor: trialkylmethylamine, n-dodecenyltrialkylmethylamine, n-lauryltrialkylmethylamine, triisooctylamine (isooctyl mixture of dimethyl hexyls and heptyls), tricaprylamine (alkyl group straight chain mostly octyl and decyl), trilauryl amine, methyl tri-n-alkyl ammonium chloride (alkyl $C_8$–$C_{10}$) and benzyl dimethyl alkyl ammonium chloride.

One important embodiment of the invention utilizes a metal or ammonium salt for di-2-ethyl-hexyl-phosphoric acid. The compound di-2-ethyl-hexyl-phosphoric acid is commonly known by a number of names. Hereafter it is referred to as D2EHPA which is intended to represent the compound having the following structural formula

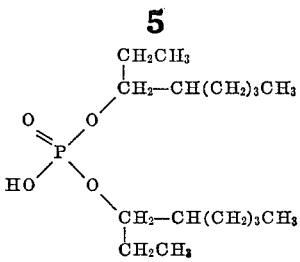

The D2EHPA is usable either in pure form or in the form currently available as an article of commerce which usually contains small amounts of both the tri- and mono-esters and some other insignificant impurities. The D2EHPA obtained from commercial sources is found to average 96% D2EHPA and the remainder mostly mono-2EHPA (mono-2-ethyl-hexyl-phosphoric acid) which has some water solubility. In order to render the D2EPHA usable it is convenient to place the extractant in a suitable diluent. Since the diluent is relatively inert to the system, the choice is usually not critical.

Similarly, the other ion extractants used in the practice of the present invention may be employed in an inert diluent, though the use of such diluent is not critical.

A wide variety of organic diluents, in which the ion extractant is dissolved, can be employed according to this invention. The minimum requirements for the diluent, however, are that the diluent be substantially water-immiscible, that it will dissolve the ion extractant, and that it will not interfere with the function of the ion extractant in extracting values from said acid solutions. These diluents can be aliphatic or aromatic hydrocarbons, halogenated hydrocarbons, petroleum derivatives, ethers, etc. Examples of these various diluents include toluene, carbon tetra-chloride. benzene, chloroform, 2-ethyl-hexanol, and particularly kerosene.

In actual tests, aromatic and aliphatic diluents were employed which include a mixture of tri-aliphatic benzenes sold under the trade name of Shell Cyclo-Sol 63, a mineral spirit (98% by wt. kerosene) sold under the trade name Shell Sol 140, as well as pure kerosene, benzene, xylene and toluene.

It has also been found to be desired to incorporate an additive in the solvent mixture to inhibit emulsions and assist in phase separation. Long chain aliphatic alcohols are well suited for this purpose and isodecanol has been found to be particularly suitable.

The acid forms of the extractants are prepared by simply mixing the various constituents in a suitable vessel. Temperature is not an important factor to consider and the mixing can be carried out at room temperature (25° C.).

The preferred and usable ranges of acid extractants are given in Table I below:

TABLE I

| Preferred range (percent by volume) | Constituent | Usable range (percent by volume) |
|---|---|---|
| 5–20 | D2EHPA | >0–70 |
| 75–93 | Diluent | 30–<100 |
| 2–5 | Additive | >0–10 |

The foregoing discussion concerning D2EHPA relates to the preparation of the acid form of a particular, preferred extractant. As previously noted, however, in accordance with the present invention the ammonium or metal form of a cationic extractant is required in order to extract hydrogen ions from the metal-bearing liquor. The D2EHPA can, however, readily be converted to its metal form. By way of example, D2EHPA can be converted to a sodium salt by the following procedure:

One liter of a mild 2 N sodium hydroxide solution containing 30 g./l. of sodium chloride is mixed in a vessel for 2 mins. with an equal volume of D2EHPA. After vigorous shaking, the mixture is allowed to settle, whereupon the organic and aqueous phase separate. The aqueous portion is drawn off, leaving an organic portion containing the sodium salt of D2EHPA. An excess of sodium hydroxide over the stoichiometric amount required is used in order to ensure high conversion of the hydrogen form of D2EHPA to the sodium form. The foregoing preparation is prepared at room temperature (25° C.) and approximately standard pressure.

Although the sodium salt has been found to be the preferred salt form of D2EHPA since sodium hydroxide is relatively inexpensive, other metal forms have been prepared and tested. These forms include the ammonium, calcium, magnesium and potassium form of D2EHPA. The preparation of these salts is identical to the foregoing preparation of the sodium salt except that a 2 N solution of the respective hydroxide of the foregoing cations is employed in lieu of sodium hydroxide.

In accordance with the invention, the sulphate solution as shown in Table II below was contacted in a countercurrent manner in a mixer settler with the sodium form of D2EHPA.

TABLE II

| Cation: | Grams/liter |
|---|---|
| Cobalt | 25–30 |
| Copper | 30–35 |
| Manganese | 0.1–0.2 |
| Iron | 7–9 |
| Zinc | 5–7 |
| Nickel | 1–2 |
| pH | 1.8 |

At this pH the D2EHPA salt preferentially first extracted hydrogen ions from the sulphate solution.

As a result of this and other tests, the graph shown in the sole figure of the drawing was constructed which shows the pH at which various metals are extractable from an aqueous solution. The data for the zinc extraction was obtained from a U.S. Bureau of Mines report.

From this graph and exhaustive tests, it was discovered that hydrogen ion is an extractable species which can be extracted by ammonium or metal salts of D2EHPA or other extractants along with iron, zinc, copper, manganese and cobalt. It was also discovered that at a low pH (about 1 to 1.5) the D2EHPA (metal form) extracts hydrogen ion until the pH is such that ferric iron is extracted. It then extracts the ferric ion followed by more hydrogen ions until the pH is such that the zinc is extracted, and so forth as shown in FIG. 1.

The following order of preference of extraction with increasing pH by the metal salt of D2EHPA was discovered:

$$H^+ > Fe^{+++} > Zn^{++} > Cu^{++}, Fe^{++}, Mn^{++} > Co^{++}, Ni^{++}$$

Thus, in accordance with the present invention, an ion extractant can exchange its ions for the metal ions or hydrogen ions in the metal-bearing liquor.

The concept of treating the hydrogen ion as an extractable species provides a convenient method of controlling the pH of the raffinates without interstage adjustments while maintaining the maximum extraction of desired metals.

In one important embodiment of the present invention, control of the pH is accomplished by regulating the flow of the metal form of D2EHPA in contact with the feed and the raffinate in the extraction stages. The amount of the D2EHPA in contact with the aqueous portion is controlled by the flow rate of the organic extractant (O) and the flow rate of the aqueous portion (A). Using this technique, it is possible to selectively extract a metal or group of metals from each other by ion extraction.

In accordance with the present invention, a sulphate solution, such as the solution shown in Table II, when contacted with the sodium form of D2EHPA of about 1.5, results in preferential extraction of the hydrogen ions from the sulphate solution by the sodium salt of D2EHPA. When the pH of the metal-bearing liquor has reached a value of about 1–2 due to the extraction of hydrogen ions, ferric ions are extracted. Thereafter, more hydrogen ions are extracted until a pH between 1.5–2.5 is reached, whereupon zinc is extracted. With iron and zinc removed, the raffinate contains copper, cobalt, manganese and nickel.

As an illustration of this technique, the following example containing 8 g./l. of iron and 7 g./l. of zinc, and 8 g./l. of $H_2SO_4$ in addition to copper, cobalt, nickel, and manganese was prepared. All the iron was in the ferric state. Separation of iron and zinc from other metals was accomplished by calculating the theoretical amount of D2EHPA (Na) required to raise the pH to 3 and extract the iron and zinc. This calculation was as follows:

$$8 \text{ g./l. Fe}^{+++} \times \frac{1 \text{ g.-m.}}{55.85 \text{ g.}} = 0.1435 \frac{\text{g.-m. Fe}^{+++}}{L}$$

$$7 \text{ g./l. Zn}^{++} \times \frac{1 \text{ g.-m.}}{65.37 \text{ g.}} = 0.1075 \frac{\text{g.-m. Zn}^{++}}{L}$$

$$8 \text{ g./l. H}_2\text{SO}_4 \times \frac{2 \text{ g. H}^+}{98 \text{ g. H}_2\text{SO}_4} \times \frac{1 \text{ g.-m. H}^+}{1 \text{ g. H}^+}$$

$$= 0.1635 \frac{\text{g.-m. H}^+}{L}$$

One g.-m. of $Fe^{+++}$ requires 3 g.-m. of D2EHPA; and likewise, 2 g.-m. of D2EPHA for 1 g.-m. of zinc and 1 g.-m. for hydrogen, therefore, $$3 \times 0.1435 = 0.4305 \text{ (Fe}^{+++})$$

$$2 \times 0.1075 = 0.2150 \text{ (Zn}^{++})$$

$$1 \times 0.1635 = \frac{0.1635}{0.8090} \text{ (H}^+)$$

Thus, 0.8090 g.-m. of D2EHPA (Na) are required per liter of feed to extract the iron, zinc and hydrogen.

Since a 20% D2EHPA solution is 0.583 molar, the following solution was prepared:

| Constituent: | Percent by volume |
|---|---|
| D2EHPA | 20 |
| Kerosene | 75 |
| Isodecanol | 5 |

With a 0.583 molar solution of D2EHPA, the O/A ratio for this feed is $$\frac{0.8090 \text{ moles metal/vol. aqueous feed}}{0.583 \text{ moles metal/vol. organic feed}}$$

Thus, for every 100 unit volumes per second of this feed, 139 unit volumes per second of extractant are required. The foregoing calculation indicates that a 20% solution of D2EHPA theoretically should load about 20 g./l. of copper or any other divalent metal in the same molecular weight range. Actually, 17–18 g./l. was found to be the maximum loading, yielding a solvent efficiency of about 85 percent.

The ion exchange extractant reactions described in this specification and examples were performed in conventional mixer settlers of the type normally utilized in liquid ion exchange reactions. In some instances commercially available Plexiglas mixer settlers were employed. These units have mixer-capacities of about 160 ml., which allows a flow rate of aqueous feed of about 30–40 ml. per minute and about a two minute contact time between organic and aqueous which was found to be adequate for the ion exchange reactions.

In order to increase the flow rates, mixer settlers having a 1-liter capacity and a 5-liter settling capacity were built. These mixer settlers were constructed of epoxy-coated plywood in banks of six cells each. Constant head tanks for feed to the units through rotometers were utilized for metering flows. The feed solution was fed to the system at ground level and was continuously pumped to the constant head tanks. With this arrangement, the excess feed solution overflowed back to the feed tanks at ground level. Although these mixer settlers were utilized for data purposes, it is to be understood that a particular mixer settler forms no part of the invention and any commercially available contact apparatus can be utilized.

In an important aspect of the disclosed process, the loaded D2EHPA was stripped by chelation. In regard to this stripping step, it was known that saccharides and other organic compounds with multiple OH groups, such as polyhydric alcohols such as mannitol, sorbitol and the glycerides, would sequester or chelate metals and thereby prevent a metal from precipitating at a pH where it would otherwise precipitate as a hydroxide. In connection with the foregoing sequestering properties of sugar compounds, such sugar compounds in the past were utilized in caustic metal solutions where precipitation of the metals was undesirable. It has, however, never been recognized that such sugar compounds cannot only sequester or chelate various metals in solution but also can assist in stripping metals from a loaded ion extractant to yield a chelate which is soluble in aqueous solutions.

The importance of the foregoing discovery is remarkable when it is considered that in the past removal of loaded metals from extractants, particularly iron removal, has proved to be difficult. In fact, $6N \cdot HCl$ has been used commercially to backwash or strip the iron from an extractant. This procedure is expensive in terms of both reagent cost and the cost of materials necessary to handle this strong and highly corrosive acid. In fact, the stripping of loaded extractants has been a problem which has prevented the widespread use of solvent extraction to recover base metals. In acocrdance with the present invention, the alkaline-sugar mixture easily and efficiently removes the iron and other metals. In this regard, it is to be understood that the invention is not limited to the removal of iron from an extractant. In accordance with the present invention, other metals which, by way of example and not by way of limitation, include zinc, manganese, cobalt and copper can also be removed from loaded extractants. In accordance with this invention, such saccharides and other sugar compounds were utilized in ligands of a soluble metal chelate.

In connection with the foregoing, as used throughout this specification and claims the term "saccharides and other sugar compounds" is intended to represent compounds that occur in large quantities as a result of photosyntheses, and contain, for the most part, hydrogen and oxygen in the same ratio as in water and carbohydrates that do not conform to the "hydrate rule." To the former class belong such compounds as rhamnose ($C_6H_2[H_2O]_5$) and rhamnoheptose ($C_7H_2[H_2O]_6$).

The carbohydrates are, actually or potentially, hydroxy or polyhydroxy oxo derivatives of the hydrocarbons; that is to say, they may be considered as polyhydroxy aldehydes, or polyhydroxy ketones, or as compounds which yield hydrolytic products that are either polyhydroxy aldehydes, or polyhydroxy ketones, or a mixture of both.

The carbohydrates may be classified, according to composition and structure as follows:

(I) Monosaccharides (monosaccharoses)
(a) Diose (two oxygen atoms)
(b) Trioses (three oxygen atoms)
    (1) Aldotrioses
    (2) Ketotrioses (c) Tetroses (four oxygen atoms)
  (1) Aldotetroses
  (2) Ketotetroses
  (3) Methyl aldotetroses
(d) Pentoses (five oxygen atoms)
  (1) Aldopentoses
  (2) Ketopentoses
  (3) Methyl aldopentoses
(e) Hexoses (six oxygen atoms)
  (1) Aldohexoses
  (2) Ketohexoses
  (3) Methyl aldohexoses
(f) Heptoses (seven oxygen atoms)
(g) Octoses (eight oxygen atoms)
(h) Nonoses (nine oxygen atoms)
(i) Glucosides, fructosides, etc.
  (II) Disaccharides (disaccharoses)
  (III) Trisaccharides (trisaccharoses)
  (IV) Tetrasaccharides (tetrasaccharoses)
  (V) Polysaccharides (polysaccharoses)
(a) Pentosans (anhydrides of pentoses)
  (1) Arabinosans (anhydrides of arabinose)
  (2) Lyxosans (anhydrides of lyxose)
  (3) Ribosans (anhydrides of ribose)
  (4) Xylosans (anhydrides of xylose)
(b) Hexosans (anhydrides of hexose)
  (1) Allosans (anhydrides of allose)
  (2) Altrosans (anhydrides of altrose)
  (3) Dextrans (anhydrides of dextrose)
    (a) Dextrins
    (b) Glycogen
    (c) Starch
    (d) Cellulose
  (4) Galactosans (anhydrides of galactose)
  (5) Gulosans (anhydrides of gulose)
  (6) Idosans (anhydrides of idose)
  (7) Levulosans (anhydrides of levulose)
  (8) Mannosans (anhydrides of mannose)
  (9) Talosans (anhydrides of talose)

The carbohydrates may be represented, with a few exceptions, by the type formula $n(C_x[H_2O]_x)-(n-1)H_2O$, where $x$ is the number of carbon atoms in a building unit and $n$ is the number of building units per molecule.

Although all the foregoing carbohydrates (sugars) are usable in accordance with the invention, cost is an important aspect in any process. In this regard, the monosaccharides and disaccharides, including pure C6 and C12 sugars, such as glucose (dextrose), fructose and sucrose, and commercial sources of these sugars, such as raw cane and beet sugars, molasses, corn syrup and high-level sugar by-products of the corn syrup industry, are especially important in practicing the invention.

In one important embodiment of the invention a loaded ion extractant is converted back to its original metal form as the loaded metal is stripped. To accomplish such simultaneous conversion and stripping, the extractant is contacted with a solution containing one of the foregoing sugar chelating agents. Preferably, such sugar chelating agents are used in an alkaline aqueout medium, the alkalinity of which is sufficient to result in a residual raffinate pH of at least about 8 and preferably about 8–11. Such a pH may be attained by inclduing in said sugar solution a hydroxide or carbonate corresponding to the original cation in the extractant, that is, either sodium, ammonium, calcium, magnesium or potassium. It is to be understood that it is preferred to use similar cations; however, it is not necessary to use similar cations. For example, calcium carbonate can be used to convert what was D2EHPA (Na) back to a metal form.

In an important embodiment of the invention, the converting and stripping solution is a solution containing approximately 8% by wt. sodium hydroxide with 30 g./l. sodium chloride and 3% by wt. of EO 81.

As used throughout this specification and claims, the substance EO 81 is intended to represent an enzose hydrol product sold by Corn Products having approximately the following composition and physical properties:

| | |
|---|---|
| Baumé Commercial (Range) | 41.8–42.2 |
| Weight percent dry substance | 79.5 |
| Weight percent dextrose equivalent | 72.0 |
| Weight percent Ash (Sulfated, Dry Basis) | 1.5–2.2 |
| pH | 3.8–4.4 |
| Lbs./gallon at 42° Baumé | 11.73 |
| Lbs./gallon (dry substance) | 9.34 |

The EO 81 solution is prepared as follows:

Approximately 11 gal. of water are placed in a 15 gal. container. Approximately 21 lbs. of a 50% by wt. sodium hydroxide solution are added with stirring to the water in the container. Thereafter, approximately 3.74 lbs. of sodium chloride are added with stirring, followed by 5 lbs. of the foregoing EO 81 sugar. After the constituents are thoroughly mixed, the container is topped with water to the 15 gal. mark and mixed until a homogeneous mixture results. The mixture can be prepared at room temperature (25° C.) and standard pressure.

In accordance with the invention, an organic extractant comprised of 20% by vol. of D2EHPA (Na), 5% by vol. isodecanol and 75% by vol. kerosene loaded with 0.6 g./l. copper, 0.1 g./l. cobalt, 0.6 g./l. manganese, 0.4 g./l. iron and 3.2 g./l. zinc was contacted counter-currently in a mixer settler with the foregoing EO 81 solution at the rate of 35 ml./min. of EO 81 solution to 155 ml./min. of loaded D2EHPA (Na). After contact, the D2EHPA contained less than 0.01 g./l. copper, less than 0.01 g./l. cobalt, 0.04 g./l. iron and 0.06 g./l. zinc. The chelates of these stripped metals remained in solution in the raffinate.

In addition to the foregoing example, numerous tests were conducted which indicated that all the foregoing sugars have utility in stripping all the liquid and solid extractants disclosed in this specification. In this regard the invention is not intended to be limited to the foregoing example.

The following example illustrates a complete process in accordance with the present invention for extracting metals from a metal-bearing liquor. The process includes as one of its steps treating the loaded ion extractant with a chelating agent so as to render the ion extractant capable of reuse. The example further illustrates the utility of the invention for extracting certain metals away from a metal-bearing liquor, leaving a desired metal in the raffinate. In the example, the desired metal is cobalt which is included with other base metals in the metal-bearing liquor.

EXAMPLE

Twelve mixer settlers, hereafter referred to as "stages," with a 1 liter mixing capacity and a 5 liter settling capacity were connected in series to form a circuit. A feed containing 5.1 g./l. copper, 50.4 g./l. cobalt, 9.0 g./l. manganese, 0.6 g./l. iron and 2.6 g./l. zinc at a pH of 2.1 was introduced at room temperature (25° C.) and standard pressure into the eighth stage of the system and travelled counter-currently to the right against the flow of a D2EHPA (Na) solution which entered at the twelfth stage and travelled to the left toward the first stage. The D2EHPA (Na) solution contained 20% by vol. D2EHPA, 5% by vol. isodecanol and 75% by vol. kerosene. A percent by weight residue which can be dissolved to give a similar feed is:

| | Percent |
|---|---|
| Cobalt | 16 |
| Copper | 2 |
| Magnesium oxide | 4 |
| Iron | .5 |
| Calcium oxide | 20 |
| Sulfur | 12 |
| Aluminum oxide | 2 |
| Manganese | 3 |
| Water | 15 |

The various parameters in the process are given in Table III below:

TABLE III.—TREATMENT OF DISSOLVED COBALT RESIDUE

[All results in grams/liter]

| Stage No. | Copper | Cobalt | Manganese | Iron | Zinc | pH |
|---|---|---|---|---|---|---|
| Feed | 5.1 | 50.4 | 9.0 | 0.6 | 2.6 | 2.1 |
| Extraction—125-130 ml./min. | | | | | | |
| Raffinate 12 | 0.05 | 43.6 | 0.04 | 0.02 | <0.01 | 5.95 |
| Organic 12 | <0.01 | 15.6 | 0.16 | 0.04 | 0.78 | |
| Aqueous 11 | 0.2 | 43.6 | 1.84 | 0.2 | | 5.45 |
| Organic 11 | 0.06 | 15.0 | 0.7 | 0.04 | 0.75 | |
| Aqueous 10 | 0.4 | 64.4 | 3.13 | 0.2 | | 5.20 |
| Organic 10 | 0.14 | 11.5 | 2.5 | 0.04 | 0.78 | |
| Aqueous 9 | 0.4 | 60.8 | 3.78 | 0.2 | | 5.10 |
| Organic 9 | 1.0 | 6.5 | 5.4 | 0.06 | 0.78 | |
| Aqueous 8 | 2.4 | 60.8 | 5.62 | 0.2 | | 4.10 |
| Organic 8 | 2.9 | 2.66 | 4.9 | 0.46 | 2.5 | |
| Cobalt scrub—13 ml./min. | | | | | | |
| Recycle 7 | 6.9 | 31.7 | 18.0 | 0.2 | | 3.75 |
| Organic 7 | 3.2 | 1.64 | 5.9 | 0.46 | 2.1 | |
| Aqueous 6 | 12.7 | 11.3 | 25.0 | 0.2 | | 2.8 |
| Organic 6 | 3.1 | 0.10 | 4.5 | 0.40 | 2.1 | |
| Strip—22 ml./min. | | | | | | |
| Strip liquor 5 | 20.0 | <1.0 | 31.0 | 0.2 | 0.75 | 2.65 |
| Organic 5 | 1.4 | 0.01 | 1.9 | 0.4 | 4.9 | |
| Aqueous 4 | 12.0 | | 19.5 | 0.2 | 15.5 | 1.5 |
| Organic 4 | 0.06 | 0.01 | 0.06 | 0.4 | 3.2 | |
| Iron strip—35 ml./min. | | | | | | |
| Strip liquor 3 | 0.50 | | 0.7 | 2.0 | 22.8 | 11.0 |
| Organic 3 | <0.01 | <0.01 | <0.01 | 0.04 | 0.06 | |

Note.—Flow rates: Feed, 130 ml./min. Organic, 155 ml./min. Scrub, 13 ml./min. Strip, 22 ml./min. Iron removal, 35 ml./min. Wash, 30 ml./min.

As is shown in Table III, the pH of the feed increases from an initial value of 2.1 to a final value of 5.95. As the pH increased, hydrogen ions were extracted and sodium ions replaced the hydrogen ions in solution. The cation extraction by the organic proceeded according to the curve shown in FIG. 1. The final raffinate leaving stage 12 had substantially all the zinc, iron, manganese and copper removed to result in a usable cobalt solution. The organic travelling to the left from stage 8 at 155 ml./min. was treated in stages 7 and 6 with a mild acid solution (88 g./l. sulfuric acid) at the flow rate of 13 ml./min. in order to strip off any cobalt co-extracted with the zinc, iron, manganese and copper. The aqueous portion containing this stripped cobalt was recycled back to the feed. This technique is referred to as "scrubbing" or "backwashing." After leaving stage 6, the organic entered the "strip" portion of the circuit, stages 5 and 4, where 22 ml./min. of the acid used in the scrub stages (7 and 6) were used to remove almost all of the metals loaded in the organic except iron. The strip liquor was discarded. The organic leaving the two strip stages 5 and 4 entered an "iron removal and sodium conversion" stage 3. In this stage the organic was primarily in the hydrogen or acid form except for the iron or other metals which were not removed in stages 4 and 5. As is shown in Table III, it contained 0.06 g./l. copper, 0.01 g./l. cobalt, 0.06 g./l. manganese, 0.4 g./l. iron and 3.2 g./l. zinc. In stage 3, the organic was treated with an 8% NaOH, 30 g./l. NaCl and 4% EO 81 (all percent by weight) solution at the flow rate of 35 ml./min. to 155 ml./min. of organic.

In stage 3, the residual pH of the raffinate was between approximately 9 and 11. This range was found to be satisfactory for complete stripping and good physical performance. In stage 3, the metals on the organic had been reduced to less than 0.01 g./l. copper, 0.01 g./l. cobalt, 0.04 g./l. iron and 0.06 g./l. zinc. The stripped metals remained in solution in the raffinate as chelates. The organic was then washed in stages 2 and 1 with a 30 g./l. sodium chloride water solution to remove physically occluded impurities and improve phase separation. The flow rate of the salt solution was 30 ml./min. The organic which had been converted back to the sodium form was then fed back to stage 12 for reuse.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. In a process for the solvent extraction of base metal ions from an acidic metal-bearing liquor to leave a raffinate containing desired base metal ions where the initial pH of the metal-bearing liquor is lower than the pH required for extraction of any base metal ions in the metal-bearing liquor and where interstage pH adjustment is required to sequentially raise the pH of the metal-bearing liquor to a series of values which are required for the extraction of base metal ions from the metal-bearing liquor wherein the improvement comprises
  (a) supplying an aqueous feed containing the base metal ions to be extracted and the desired base metal ions,
  (b) contacting said metal-bearing liquor with an ion extractant which is a salt form of an organo phosphorous compound capable of extracting hydrogen ions therefrom and raising the pH of said metal-bearing liquor to a first value, said first value being the value which is required for the extraction of first base metal ions to be extracted, by extracting hydrogen ions from said metal-bearing liquor with said ion extractant and thereby eliminating the need for using a base to raise the pH of the metal-bearing liquor to said first value,
  (c) extracting said first base metal ions while the pH of said metal-bearing liquor is at said first value,
  (d) repeating step (b) to extract hydrogen ions and thereby raise the pH to a second value, said second value being higher than said first value and being the value required for the extraction of second base metal ions to be extracted,
  (e) extracting said second base metal ions while the pH of said metal-bearing liquor is at said second value, and
  (f) repeating contacting of said metal-bearing liquor with said ion extractant to sequentially raise the pH of said metal-bearing liquor to said values which are required for the extraction of the base metal ions thereafter, extracting base metal ions from said metal-bearing liquor while the pH of said metal-bearing liquor is at the value required for extraction of the base metal ions to be extracted until a raffinate remains which contains said desired base metal ions.

2. The process as set forth in claim 1 wherein said metal-bearing liquor contains cobalt ions and wherein cobalt ions remain in the raffinate.

3. The process as set forth in claim 1 wherein said metal-bearing liquor contains nickel ions and wherein nickel ions remain in the raffinate.

4. The process as set forth in claim 1 wherein said metal-bearing liquor contains cobalt and nickel ions and wherein cobalt and nickel ions remain in the raffinate.

5. The process as set forth in claim 1 wherein said metal-bearing liquor contains base metal ions selected from the group consisting of iron, cobalt, nickel, zinc, manganese, magnesium, calcium and copper and wherein the process is repeated until a raffinate remains which contains base metal ions selected from the group consisting of copper, cobalt, manganese and nickel.

6. The process as set forth in claim 5 wherein said process is continued until said raffinate contains base metal ions selected from the group consisting of nickel and cobalt.

7. The process as set forth in claim 1 wherein said metal-bearing liquor contains base metal ions selected from the group consisting of ferric iron, zinc, copper, manganese, ferrous iron, nickel and cobalt and wherein the pH of said metal-bearing liquor is raised to a value required for the extraction of ferric iron and zinc ions by extracting hydrogen ions from said metal-bearing liquor and wherein ferric iron and zinc ions are extracted from said metal-bearing liquor and wherein the pH of the metal-bearing liquor is thereafter raised to a value required for the extraction of copper, manganese and ferrous iron ions, wherein copper, manganese and ferrous iron ions are extracted from said metal-bearing liquor to leave a raffinate containing nickel and cobalt ions.

8. The process as set forth in claim 1 wherein said organo phosphorous compound is represented by the following structural formula:

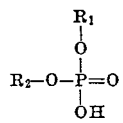

where the total number of carbon atoms in each R group is between 4–20 carbon atoms and where $R_1$ contains at least one member selected from the group consisting of alkyl, aryl and aralkyl radicals.

9. The process as set forth in claim 1 wherein said organo phosphorous compound is di-2-ethyl-hexyl phosphoric acid.

10. The process as set forth in claim 9 wherein the cation portion of said salt form of an organo phosphorous compound is selected from the group consisting of ammonium, calcium, magnesium and potassium ions.

11. The process as set forth in claim 9 wherein the cation portion of said salt form of an organo phosphorous compound is sodium.

12. The process as set forth in claim 1 wherein said organo phosphorous compound is selected from the group consisting of heptadecylphosphoric acid, dodecylphosphoric acid, di(1-methylheptyl) phosphoric acid, di(2-ethyl-4-methyl-pentyl) phosphoric acid, di(2-propyl-4-methyl-pentyl) phosphoric acid, octylphenyl phosphoric acid, and the isooctyl and stearyl derivatives of alkyl acid phosphates.

13. The process as set forth in claim 12 wherein said isooctyl derivative of the alkyl acid phosphate is diisooctylphosphoric acid.

References Cited

UNITED STATES PATENTS

| | | | |
|---|---|---|---|
| 932,643 | 8/1909 | Schneider | 75—101 X |
| 2,896,930 | 7/1959 | Menke | 75—101 X |
| 3,055,754 | 9/1962 | Fletcher | 75—121 X |
| 3,085,875 | 4/1963 | McCarroll | 75—101 |
| 3,104,971 | 9/1963 | Olson et al. | 75—117 |
| 3,211,521 | 10/1965 | George et al. | 75—121 X |
| 3,343,912 | 9/1967 | Schulz | 23—312 X |
| 3,374,090 | 3/1968 | Fletcher et al. | 75—120 X |
| 3,399,055 | 8/1968 | Ritcey et al. | 75—119 |
| 3,438,768 | 4/1969 | Ashbrook et al. | 75—119 |
| 3,441,372 | 4/1969 | Pegler et al. | 75—120 X |
| 3,214,239 | 10/1965 | Hazen et al. | 75—101 BE UX |
| 3,479,378 | 11/1969 | Orlandini et al. | 75—121 X |
| 3,507,645 | 4/1970 | Spitzer et al. | 75—101 |

OTHER REFERENCES

Brisk et al.: J. Appl. Chem., vol. 19, (April 1969), pp. 103–114.

L. DEWAYNE RUTLEDGE, Primary Examiner

G. T. OZAKI, Assistant Examiner

U.S. Cl. X.R.

23—312; 75—117, 119, 120, 121; 210—38

PO-1050
(5/69)

UNITED STATES PATENT OFFICE
CERTIFICATE OF CORRECTION

Patent No. 3,666,446        Dated May 30, 1972

Inventor(s) Lorne F. Cook and Wallace W. Szmokaluk

It is certified that error appears in the above-identified patent and that said Letters Patent are hereby corrected as shown below:

Column 3, line 18 after the structural formula, "diiooctylphosphoric" should read --diisooctylphosphoric--.

Column 4, line 6 after the second structural formula, "ethyldodecyl" should read --ethylbutyldodecyl--;

line 5 from the bottom, "for" should read --form of--.

Column 5, line 8 after the structural formula, "D2EPHA" should read --D2EHPA--;

line 33 after the structural formula, "desired" should read --desirable--.

Column 7, line 3, --at a pH-- should appear after "D2EHPA".

line 43, "$1 \times 0.1635 = \frac{0.1635}{0.8090} (H^+)$" should read --$1 \times 0.1635 = \frac{0.1635}{0.8090} (H^+)$--.

line 57, "$\frac{0.8090 \text{ moles metal/vol. aqueous feed}}{0.583 \text{ moles metal/vol. organic feed}}$" should read --$\frac{0.8090 \text{ moles metal/vol. aqueous feed}}{0.583 \text{ moles metal/vol. organic feed}} = 1.39$--

Column 9, line 59, "aqueout" should read --aqueous--;

line 62, "inclduing" should read --including--.

Signed and sealed this 6th day of March 1973.

SEAL)
ttest:

DWARD M. FLETCHER, JR.            ROBERT GOTTSCHALK
ttesting Officer                     Commissioner of Patents